United States Patent
Maier et al.

(10) Patent No.: US 7,119,951 B2
(45) Date of Patent: Oct. 10, 2006

(54) POLARIZER FOR HIGH-POWER DEEP UV RADIATION

(75) Inventors: Robert L Maier, Ontario, NY (US); Douglas S. Goodman, Pittsford, NY (US)

(73) Assignee: Corning Incorporated, Corning, NY (US)

( * ) Notice: Subject to any disclaimer, the term of this patent is extended or adjusted under 35 U.S.C. 154(b) by 154 days.

(21) Appl. No.: 10/936,241

(22) Filed: Sep. 7, 2004

(65) Prior Publication Data

US 2006/0050370 A1 Mar. 9, 2006

(51) Int. Cl.
*G02B 5/30* (2006.01)

(52) U.S. Cl. ............... 359/352; 359/487; 359/629; 359/495

(58) Field of Classification Search ........... 359/352
See application file for complete search history.

(56) References Cited

U.S. PATENT DOCUMENTS

| 2,403,731 | A | | 7/1946 | MacNeille | |
|---|---|---|---|---|---|
| 5,339,441 | A | * | 8/1994 | Kardos et al. | 359/352 |
| 5,683,480 | A | * | 11/1997 | Taniguchi | 65/17.2 |
| 6,574,039 | B1 | * | 6/2003 | Murata et al. | 359/359 |
| 6,697,194 | B1 | * | 2/2004 | Kuschnereit et al. | 359/359 |
| 2004/0252369 | A1 | * | 12/2004 | Wilklow | 359/359 |

OTHER PUBLICATIONS

*Thin Film Optical Filters*, 2nd Ed. Angus Macleod, Macmillan Co. NYC 1986, p. 332 description of thin film plate polarizers.
*Concepts of Classical Optics*, John Strong, Freeman & Co, San Franciscio 1958, p. 122 description of "pile of plates" polarizer.

* cited by examiner

*Primary Examiner*—Arnel C. Lavarias
*Assistant Examiner*—Derek Chapel
(74) *Attorney, Agent, or Firm*—Timothy M. Schaeberle

(57) ABSTRACT

A polarizing effect is achieved for light having wavelengths less than 250 nm by orienting an antireflector at an incidence angle between 65° and 75°. Despite limited choices for materials, the antireflector is constructed of layers that alternate in refractive index to exploit the mechanism of interference for limiting the reflectivity of one linear polarization component of the light. The same combination of layers supports the reflectivity of an orthogonal linear polarization component. The light reflected from the antireflector is highly polarized.

65 Claims, 10 Drawing Sheets

POLARIZER FOR HIGH-POWER DEEP UV RADIATION

BACKGROUND OF THE INVENTION

1. Field of the Invention

The invention relates to the polarization of light within the deep UV spectrum at wavelengths of less than 250 nm, particularly at high power densities above 5 milli-joules per square centimeter per pulse.

2. Description of the Related Art

Polarizing ultraviolet light at wavelengths below 250 nm, particularly at power densities above five milli-joules per centimeter squared per pulse, presents special challenges. The typical optical materials for longer wavelength applications are either insufficiently transmissive or subject to breakdown at the short wavelengths and high power densities. Excimer lasers operating at 157 nm can be arranged to cut through all known solids including diamonds. Thus, the challenges for conveying or manipulating such light at somewhat lower concentrations are high.

Traditional polarizers are available in a number of different designs. These include cemented birefringent crystals in different relative orientations. The birefringent crystals have different effective refractive indices for different directions of polarization. The result is that one polarization component is refracted in one direction and the orthogonal polarization component is refracted in another direction. To function properly, the two crystals must be precisely oriented with respect to each other. Generally, this is done by cementing the two crystals together at a common interface. However, such polarizers cannot be used in the specified UV energy regime, because the UV radiation breaks down all of the known cements.

A similar polarizer design omits the cement by forming the mating surfaces between crystals with a high degree of flatness so that local polar forces between intimately related surfaces hold the crystals together. However, even such precisely mating surfaces have defects containing atmospheric materials that suffer slight surface absorption, which causes heating and subsequent delamination.

Another type of polarizer orients a succession of plates at Brewster's angle to the incident light. At each leading interface, one of the polarization components, i.e., the P polarization component oriented within the plane of incidence, is transmitted while a significant portion of the orthogonally related polarization component, i.e., the S polarization component oriented normal to the plane of incidence, is reflected. The plates are stacked one after the other so that each subsequent plate renders the transmitted beam more P polarized. However, some distortion occurs at each of the reflective interfaces, which can spatially disperse the incident light. The spatial dispersion alters the angle of incidence at which the light approaches subsequent plates, degrading performance and causing losses. In addition, the design is bulky, sensitive to collimation errors and can be optimized for only a single wavelength.

A polarizer known as the "MacNeille polarizer", features a coating at a prism-to-prism interface formed by two coating layers having refractive indices that differ from each other and from the refractive indices of the adjacent prisms. The typical performance of the MacNeille polarizer includes a certain wavelength bandwidth over which reflection of the P polarization component remains near zero, while the reflection of the S polarization component is substantial. A substantial difference in the refractive indices of the two coated layers is required to achieve this type of performance. However, comparable coatings are not available for use a within the specified high-power, short-wavelength regime contemplated for the invention. The indices of the available coatings are too close to each other.

Another known type of polarizer is based on a thin film (quarter wavelength) dielectric stack. Here, alternating quarter-wavelength layers of differing refractive indices are deposited on a substrate. Although the reflectivity characteristics of both polarizations tend to parallel one another, there are gaps at limited wavelength ranges where one polarization is reflected much more than the other. However, the coating materials typically used for making such quarter-wavelength layers are not available for use in the high-power, short-wavelength regime contemplated for the invention. Again, the materials that are available tend not to differ very much in refractive index.

BRIEF SUMMARY OF THE INVENTION

The invention is based in part upon an observation that certain antireflective coatings used on high-incidence-angle prism surfaces of deep UV laser tuning systems exhibit not only the intended low reflectivity (i.e., high transmittance) for one polarization component of the incident light but also exhibit high reflectivity (i.e., low transmittance) for an orthogonal polarization component of the incident light that is normally discarded or ignored. For example, while the reflection of the P polarization component can be as low as 0.002% or less in accordance with the intended function of the antireflective coatings, the reflection of the S polarization component can be as high as 90% or more from the same antireflective coatings fashioned for use in the deep UV at high angles of incidence.

The antireflective coatings used in the deep UV tuning systems promote high transmittance to avoid losses of light associated with prism encounters at high angles of incidence. However, the invention is more concerned with the light reflected from the antireflective coatings, which is normally discarded or ignored. Starting with unpolarized light, the antireflective coatings can be arranged in accordance with the invention to function as polarizers that exhibit high polarization extinction ratios (e.g., S/P) for the reflected light. As a part of the polarizing function, the transmitted light, which has a much lower polarization extinction ratio (e.g., P/S), can be discarded or ignored. However, the antireflective coatings can be arranged in accordance with the invention to also function as beamsplitters, resulting in the further propagation of two substantially orthogonally polarized beams.

One embodiment of the invention as a polarizing system for deep UV light includes a substrate having a surface normal inclined between 65° and 75° to a direction of propagation of an unpolarized beam of light having a nominal wavelengths less than 250 nm. An antireflective coating on the surface of the substrate reflects no more than 2% of a first of two orthogonally related polarization components of the unpolarized beam of light in keeping with the usual function of an antireflective coating. However, the antireflective coating also reflects at least 80% of a second of the two orthogonally related polarization components of the unpolarized beam of light. An optical beam conveyor routes a first portion of the unpolarized beam that is reflected from the antireflective coating as a substantially polarized beam intended for further propagation.

It is the reflected first portion of the originally unpolarized beam that is most highly polarized as measured by its extinction ratio of the second orthogonally related polarization component divided by the first orthogonally related polarization component. The extinction ratio is at least 40 to 1 as defined by the at least 80% reflection of the second polarization component divided by the no more than 2% reflection of the first polarization component. The extinction ratio of the remaining portion of the unpolarized beam that is transmitted through the antireflective coating is much less in the range of 5 to 1 as defined by the at least 98% transmission of the first polarization component divided by the no more than 20% transmission of the second polarization component.

Thus, for purposes of polarization, the invention provides for the further propagation of the light reflected from the antireflective coating. The light transmitted through the antireflective coating can be discarded. Preferably, the polarizing system includes a beam disposer for abandoning the second portion of the unpolarized beam that is transmitted through the antireflective coating. The beam disposer can include one or more of a diffusion pattern on a back surface of the same substrate that supports the antireflective coating, a redirector for changing the beam direction in various planes, a series of partial reflectors, and a beam dump. The objective is to safely discard the unwanted light while avoiding retroreflections that can diminish the desired polarizing effects.

The antireflective coating preferably includes a stack of layers that alternately vary in refractive index. The layers have a nominal thickness equal to an integer multiple of one-quarter of the nominal wavelength of the unpolarized beam measured in the direction of propagation. Although, theoretically, the extinction ratio of the polarized beam provided by the antireflective coating can be increased with an increasing number of layers, stress tends to accumulate within the layers and can produce undesirable scattering. Accordingly the number of layers is preferably limited to around 20 layers, and polarizers having between 7 to 11 layers are preferred. A refractive index difference between the alternating layers is expected to be in a range between 0.2 and 0.6, indicative of the limited choices of materials qualified for use in the intended energy regime.

The optical beam conveyor preferably includes at least one reflective surface for further propagating the substantially polarized beam. More preferably, the optical beam conveyor includes a plurality of reflective surfaces for further propagating the substantially polarized beam coaxial with the propagating direction of the unpolarized beam. One or more of the reflective surfaces can include a similar antireflective coating that reflects no more than 2% of the first of two orthogonally related polarization components and that reflects at least 80% of the second of the two orthogonally related polarization components of the substantially polarized beam of light for further extinguishing the first of the two orthogonally related polarization components of the substantially polarized beam.

Another embodiment of the invention as polarization-sensitive routing system for ultraviolet light has a working optical pathway for conveying an unpolarized beam of ultraviolet light having a wavelength less than 250 nm. An antireflector is inclined to the working optical pathway such that rays within the unpolarized beam of ultraviolet light encounter the antireflector at angles of incidence above Brewster's angle. The antireflector includes a plurality of layers that exploit a mechanism of interference for reducing reflectivity of P polarization components of the unpolarized beam that are oriented within planes of incidence while substantially reflecting S polarization components of the unpolarized beam that are oriented normal to the planes of incidence. A beam conveyer routes a first portion of the unpolarized beam that is reflected from the antireflector as a substantially S polarized beam at an extinction ratio of S polarization to P polarization of at least 40 to 1 along the working optical pathway for productive use.

The antireflector transmits a second portion of the unpolarized beam as a substantially P polarized beam at an extinction ratio of P polarization to S polarization of substantially less than 40 to 1. If the second portion of the unpolarized beam is not further manipulated for productive use, a beam disposer preferably abandons the substantially P polarized beam that is transmitted through the antireflector. However, for purposes of beamsplitting, the beam conveyor can be a first of two beam conveyors, and a second of the conveyors routes the substantially P polarized beam for further propagation. The antireflector can be formed as an antireflective coating on a substrate, and the substrate can be made of calcium fluoride ($CaF_2$) for transmitting the substantially P polarized beam.

Preferably the antireflector provides for reflecting less than 0.5% of the P polarization component of the unpolarized beam of light and for reflecting more than 85% of the S polarization component of the unpolarized beam of light for an extinction ratio of over 170 to 1. The antireflector is preferably composed of a stack of layers that alternate in refractive index and are inclined to the working optical pathway such that the rays within the unpolarized beam of ultraviolet light encounter the antireflector at angles of incidence between 65° and 75°.

Particularly for functioning as a polarizer, the antireflector of the polarization-sensitive routing system can be a first of a plurality of antireflectors arranged in series for further polarizing the substantially S polarized beam. The extinction ratio for a series of identical antireflectors is the extinction ratio of one of the antireflectors raised to the power of the number of antireflectors in series. If 90% of the S polarization and only 0.5% of P polarization is reflected by each of four antireflectors arranged in series, then more than 65% of the total S polarized light is propagated at an extinction ratio of over one-billion to one.

Yet another embodiment of the invention as a polarizer for polarizing deep UV light includes a substrate having a mounting surface inclined to an optical axis along which the deep UV light is propagated and a series of layers supported on the substrate having refractive indices that vary in an alternating pattern of higher and lower refractive indicies. The layers are adjusted in thickness for optimizing conditions of interference between reflections of the deep UV light from adjacent layers. A normal of the layers is inclined to an optical axis through an angle of incidence at which an extinction ratio between orthogonally related polarization components in a reflected beam approaches a maximum. The angle of incidence is within a range at which the maximum extinction ratio occurs at progressively higher angles of incidence as the refractive index of the higher refractive index layers increases. The number of layers is within a range at which the maximum extinction ratio occurs at progressively higher angles of incidence as the number of layers increases.

Preferably, the high refractive index layers have a refractive index of between 1.65 and 1.8 and the low refractive index layers have a refractive index between 1.35 and 1.5. A refractive index difference between the high and low refractive index layers is preferably at least 0.2 and no greater than 0.6. The layers include an innermost layer and an outermost layer. The innermost layer is adjacent to the substrate and the outermost layer is among the layers having the higher refractive index.

The layers are preferably arranged to promote destructive interference between reflections of P polarized light having an electric field vector extending within a plane of incidence and are arranged to promote constructive interference between reflections of S polarized light having an electric field vector extending normal to the plane of incidence.

The angle of incidence is preferably between 65° and 75° and more preferably between 68° and 73°. The number of layers is preferably at least 7 and no greater than 20 and more preferably at least 7 and no greater than 11. The maximum extinction ratio is preferably at least 100 to 1 and more preferably at least 1000 to 1.

BRIEF DESCRIPTION OF THE OF SEVERAL VIEWS OF THE DRAWING(S)

Figure 12A:
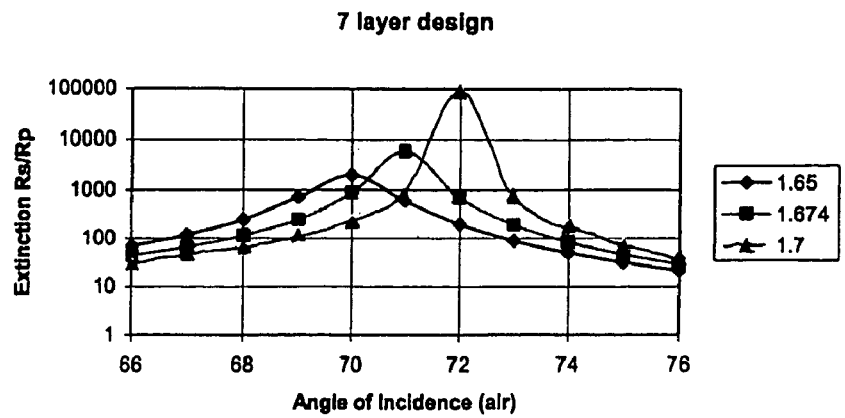
Figure 12B:
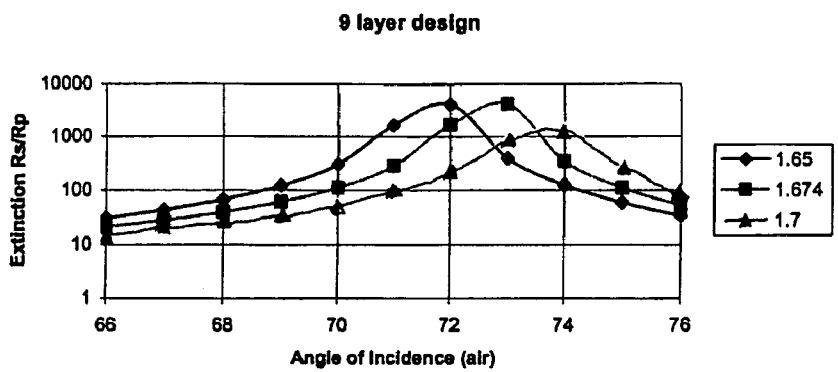
Figure 12C:
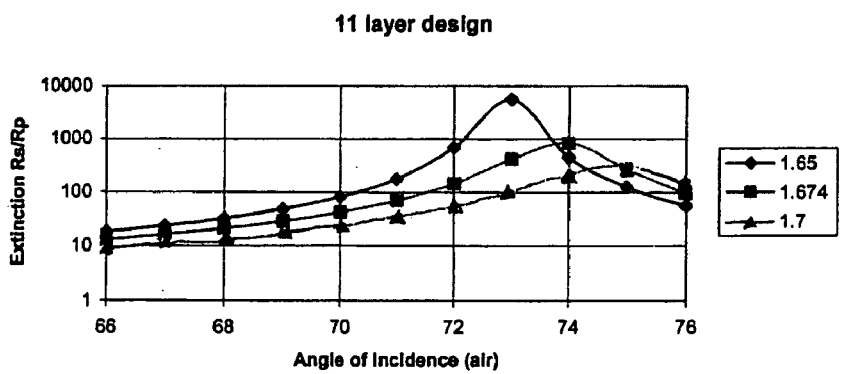

FIGS. 12A–12C include a sequence of plots for different numbers of layers, each plotting the extinction ratio of S to P polarization for three different refractive index layers over a domain of incidence angles.

DETAILED DESCRIPTION OF THE INVENTION

Figure 1:
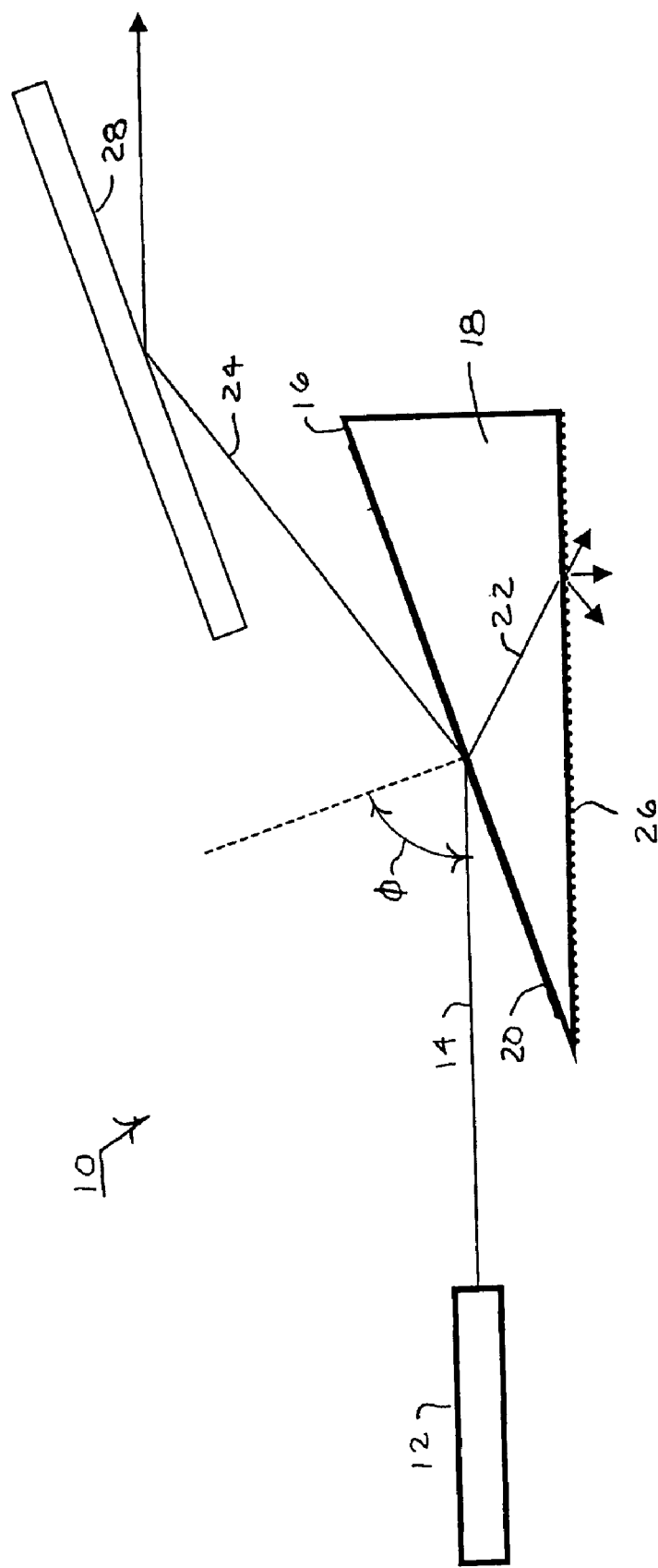
FIG. 1 is a diagram of a polarizing system including an antireflective coating on a prism substrate for reflecting a portion of an incident unpolarized beam as a highly polarized beam.

A polarizing system 10 is shown in FIG. 1 of the type that can be used for the practice of the present invention includes a laser light source 12, such as an excimer laser, that emits a collimated beam of unpolarized light 14 having a nominal wavelength less than 250 nm (e.g., 193 nm or 157 nm) and a power density greater than 5 milli-joules per square centimeter per pulse. Such an unpolarized beam 14 is not limited to randomly polarized light but also includes insufficiently or inappropriately polarized light. The collimated beam 14 approaches a leading surface 16 of a prism 18 at an incidence angle φ between 65° and 75°. As unpolarized light, the incident beam 14 includes both P polarization components that oscillate in the plane of incidence (i.e., the plane of FIG. 1) and S polarization components that oscillate normal to the plane of incidence.

An antireflective coating 20 is applied to the leading surface 16 of the prism 18 to differentially affect orthogonally related polarization components of the unpolarized beam 14. As an antireflector, the antireflective coating 20 is intended to reflect only a small percentage (e.g., less than 2%) of the P polarization components that oscillate in the plane of incidence. Thus, most of the P polarization components of the unpolarized beam 14 pass through the antireflective coating 20 into the prism 18 as a part of a transmitted beam portion 22, while only a small residual part of the P polarization components reflect from the antireflective coating as a part of a reflected beam portion 24.

The prism 18 is preferably made of a material, such as fused silica, that is substantially transmissive at the wavelengths less than 250 nm and exhibits low coefficient of thermal expansion. The transmissive nature of fused silica moderates the accumulation of heat within the prism (caused by photon absorption), which can lead to thermal instabilities in most materials, and the low coefficient of thermal expansion of the fused silica limits dimensional changes that occur as a result of any such heating. Other shapes of substrates can be used in place of the prism 18, such as plane-parallel plates, for supporting the antireflective coating 20. However, prisms provide a convenient way of mounting in orienting inclined surfaces within optical systems.

In addition to functioning as an antireflector, the antireflective coating 20 also functions in accordance with the invention as a reflector for reflecting a large percentage of the S polarization components that oscillate normal to the plane of incidence. For example, at least 80% of the S polarization components reflect from the antireflective coating 20 as the main part of the reflected beam portion 24. The remaining percentage of the S components transmits through the antireflective coating as a lesser part of the transmitted beam portion 22.

The reflected beam portion 24 is a highly polarized beam benefiting from a high extinction ratio between the reflectivities of the S polarization components and the P polarization components. With the reflectivity of the S polarization components of at least 80% and the reflectivity of the P polarization components of no more than 2%, the S/P extinction ratio of the reflected beam portion 24 is at least 40 to 1. By optimizing the antireflective coating 20 to further limit reflection of the P polarization components, the extinction ratio can be increased to 100 to 1 or to even more than 1000 to 1. For example, a reflectivity of 0.1% of the P polarization components yields an extinction ratio of 800 to 1 without further optimizing the reflectivity of the S polarization components.

The inverse P/S extinction ratio of the transmitted beam portion 22 is considerably lower. Although at least 98% of the P polarization components are transmitted, as much as 20% of the S polarization components are also transmitted, yielding a P S extinction ratio of less than 5 to 1. Thus, the transmitted beam portion 22 is much less polarized than the reflected beam portion 24. For this reason or others, it may be desirable to discard the transmitted beam portion 22. This can be accomplished in a variety of ways. For example, the transmitted beam portion 22 can be directed to a beam dump. As shown in FIG. 1, a base of the prism 18 is formed with a diffuse surface 26 that scatters the transmitted beam portion 22.

The reflected beam portion 24 encounters an optical beam conveyer, such as a reflective surface (e.g., mirror) 28, for further propagating the reflected beam portion 24 along a working pathway for productive use. The optical beam conveyer can take a variety of forms, including virtually any type of optic capable of furthering the propagation of the reflected beam portion 24 along a working pathway. The beam conveyer's most fundamental purpose is as an optical investment in the further propagation of the reflected beam portion 24, which is normally discarded or ignored as an unintended consequence of an antireflective coating operating at less than perfect efficiency.

However, the beam conveyer can also perform specific functions that affect the further orientation and alignment of the reflected beam portion 24, such as performed by the reflective surface 28, or that more completely polarize the reflected beam portion 24. For example, the beam conveyer shown in FIG. 2 functions as a second polarizer in series. Elements in common between the polarizing system 10 of FIG. 1 and an alternative polarizing system 30 of FIG. 2 share the same reference numerals.

In place of the reflective surface 28, the reflected beam portion 24 of the polarizing system 30 encounters another antireflective coating 40 on a leading surface 36 of a prism 38 through an incidence angle $\phi$ between 65° and 75°. Similar to the antireflective coating 20, the antireflective coating 40 preferably reflects no more than 2% of the remaining P polarization components of the reflected beam portion 24. Thus, not more than 2% of the not more than 2% of the original P polarization components from the unpolarized beam 14 are reflected as a part of the further reflected beam portion 44. At least 98% of the not more than 2% of the P polarization components of the reflected beam portion 24 are transmitted through the antireflective coating 40 as a part of a transmitted beam portion 42.

The antireflective coating 40 also reflects at least 80% of the S polarization components of the reflected beam portion 24. Thus, at least 80% of the at least 80% of the original S polarization components from the unpolarized beam 14 are reflected as another part of the further reflected beam portion 44. Not more than 20% of the at least 80% of the original S polarization components transmit through the antireflective coating 40 as another part of the transmitted beam portion 42.

The remaining S polarization components in the further reflected beam portion 44 amount to at least 64% (0.80$^2$*100) of the S polarization components in the unpolarized beam 14. The remaining P polarization components in the further reflected beam portion 44 amount to no more than 0.04% (0.02$^2$*100) of the P polarization components in the unpolarized beam 14. Thus, the extinction ratio of S polarization to P polarization contributed by the two antireflective coatings 20 and 40 in series is at least 1600 to 1 (64%/0.04%). If the reflectivity of the P polarization components were to be dropped below 0.1% as is preferred for the practice of the invention, then the extinction ratio exceeds 640,000 to 1.

A much smaller percent of the originally unpolarized polarized beam 14 transmits through the antireflective coating 40 as the transmitted beam portion 42. Given the original reflection/transmission parameters, the transmitted beam portion 42 includes not more than 16% of the S polarized components of the unpolarized beam 14 and not more than 2% of the P polarized components of the unpolarized beam 14. Accordingly, the prism of 38 is not required to accommodate nearly as high energy densities as the prism 18 so that more material choices are available for its construction. Although it would be possible to put the transmitted beam portion 42 to some productive use, the prism 38 like the prism 18 includes a diffuse base surface 46 for discarding the beam portion 42.

The antireflective coating 40 together with its prism substrate 30 functions both as an optical beam conveyer for redirecting a further reflected beam portion 44 along a working pathway parallel to the original pathway of the unpolarized beam 14 and as a polarizer for further polarizing the further reflected beam portion 44 at an exponentially increased extinction ratio. Assuming that the antireflective coatings 20 and 40 are mounted on planar prism surfaces 16 and 36, the S polarization components of the further reflected beam portion 44 are all commonly oriented with respect to each other, and this common orientation can be controlled by rotating the prisms 18 and 38 together with their antireflective coatings 20 and 40 about a reference axis 34 aligned with the original propagating direction of the unpolarized beam 14.

Figure 2:
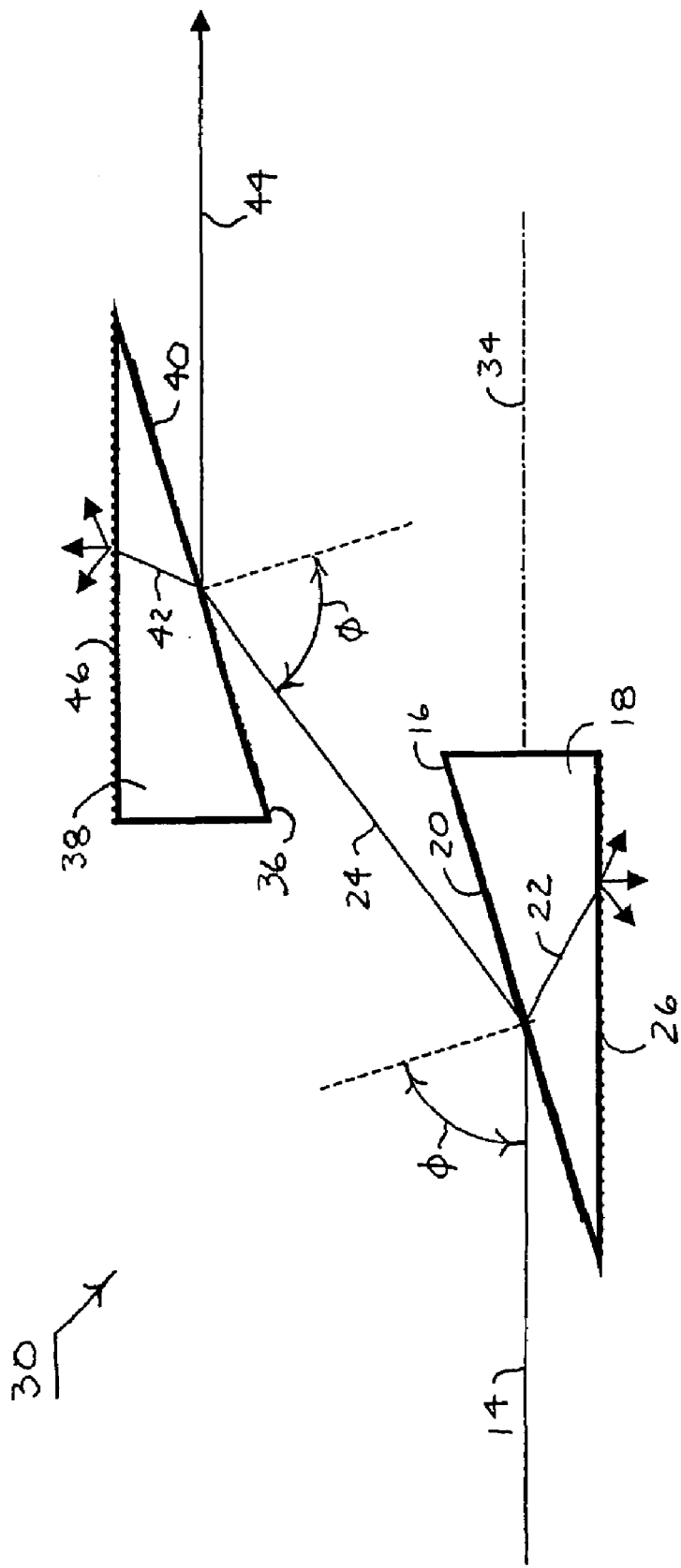
FIG. 2 is a diagram of another polarizing system including two polarizers in series for further polarizing beam portions reflected from antireflective surfaces.

In accordance with the embodiments of FIGS. 1 and 2, the collimated beam 14 is referred to as an unpolarized beam. In actual use, the incident collimated beam 14 can be partially or even fully polarized to a specific direction. However, it is with respect to its unpolarized form of the beam 14 that the measures for the intended extinction ratios are taken.

Figure 3:
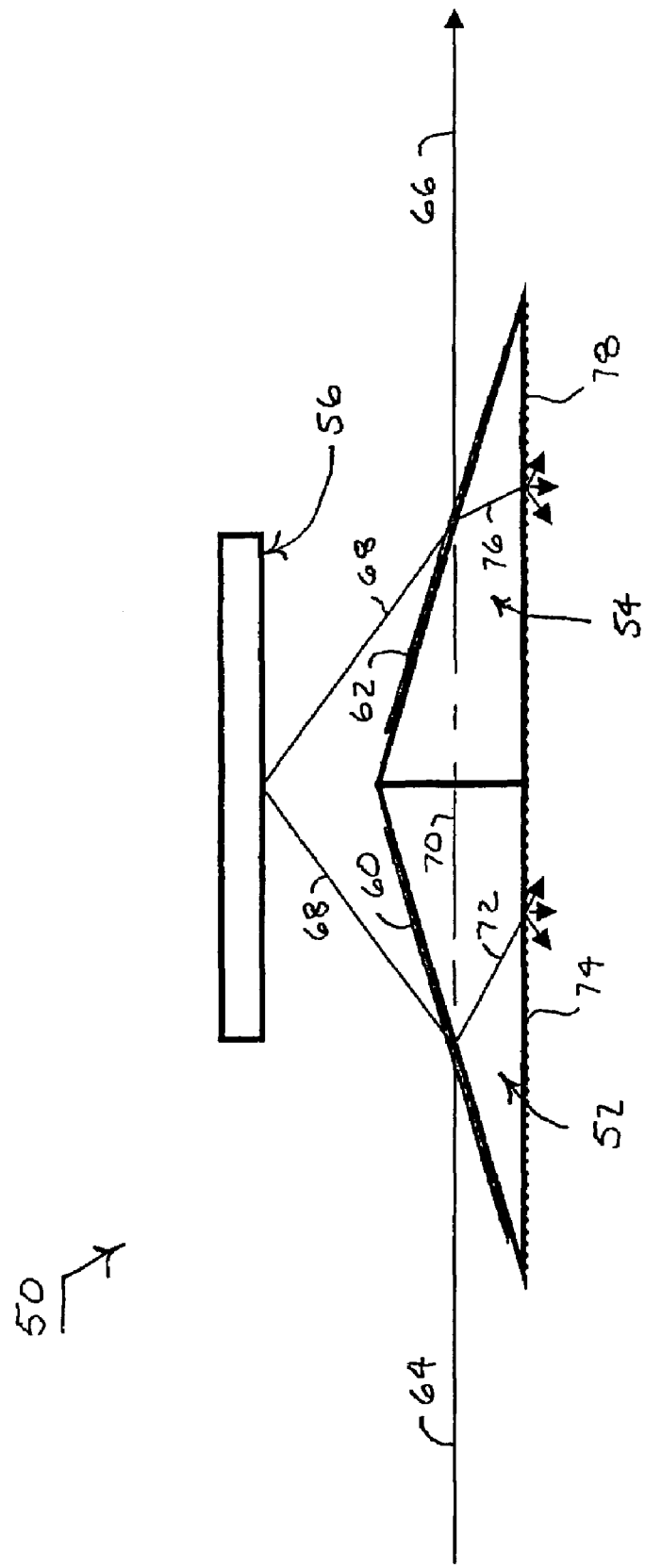
FIG. 3 is a diagram of two similar polarizers interconnected by a reflective optic for realigning a polarized beam with an unpolarized beam from which it is derived.

FIG. 3 illustrates a polarizing system 50 including two prism polarizers 52 and 54 having antireflective surfaces 60 and 62 similar to the preceding embodiments interconnected by a reflective surface 56 for converting an unpolarized input beam 64 into a polarized output beam 66 that is aligned with the unpolarized input beam 64.

The antireflective coating 60 reflects a substantial portion of the S polarization components of the unpolarized beam 64 (e.g., at least 80%) but only a minor portion of the P polarization components of the unpolarized beam 64 (e.g., no more than 2%) as respective parts of a reflected beam portion 68. An extinction ratio of S to P polarization of at least 40 to 1 is achieved by the respective reflections. Conversely, the antireflective coating 60 transmits a substantial portion of the P polarization components of the unpolarized beam 64 (e.g., at least 98%) and to a much lesser extent transmits a portion of the S polarization components of the unpolarized beam 64 (e.g., no more than 20%) as respective parts of a transmitted beam portion 72.

A diffuse surface 74 on the base of the prism polarizer 52 disposes of the transmitted beam portion 72. However, the reflective surface 56 functions as an optical beam conveyer for redirecting the transmitted beam portion 68 toward the polarizer 54, which is aligned along a common optical axis 70 with the polarizer 52. The polarizer 54 functions similar to the polarizer 52 by reflecting a substantial portion of the P polarization components within the transmitted beam portion 68 (e.g., at least 80% of at least 80%) while reflecting only a minor portion of the remaining S polarization components within the transmitted beam portion 68 (e.g., no more than 2% of not more than 2%) as respective parts of the output beam 66. The antireflective coating 62 transmits most of the remaining P polarization components of the reflected beam portion 68 (e.g., at least 98% of the no more than 2%) and a portion of the S polarization components (e.g., no more than 20% of the at least 80%) as respective parts of a transmitted beam portion 76. A diffuse surface 78 disposes of the transmitted beam portion 76.

The reflected output beam 66 is polarized as a product of the individual extinction ratios exhibited by the two polarizers 52 and 54. In addition, the two polarizers are aligned with each other and oriented in relation to the reflective optic 56 so that the polarized output beam 66 is aligned with the input beam 64 along the common optical axis 70. The two polarizers 52 and 54 can be rotated together with the reflective optic 56 around the common optical axis 70 to control the orientation of the linearly polarized light within the output beam 66.

Figure 4:
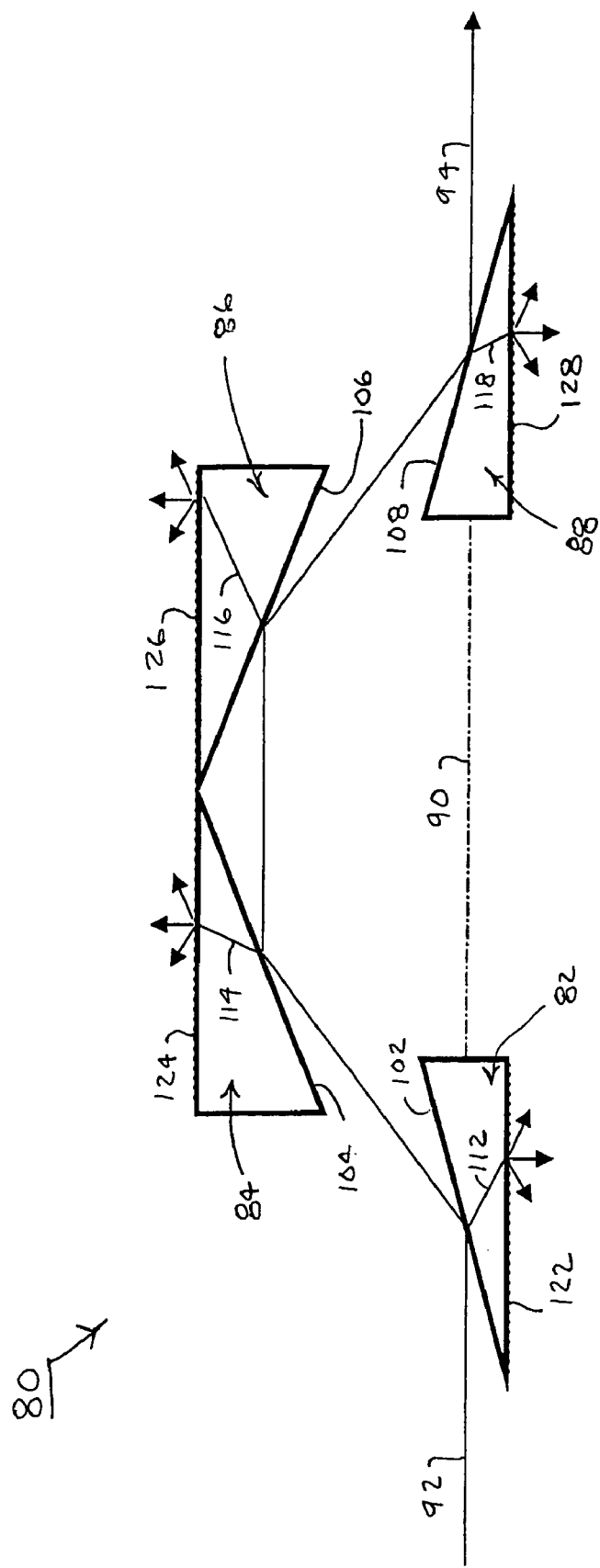
FIG. 4 is a diagram of four similar polarizers arranged in series for both further polarizing and realigning a polarized beam with an unpolarized beam from which it is derived.

A polarizing system 80 depicted in FIG. 4 includes four polarizers 82, 84, 86, and 88 arranged in a series that converts an unpolarized input beam 92 into a polarized output beam oriented along the same optical axis 90. Each of the polarizers 82, 84, 86, and 88 includes an antireflective coating 102, 104, 106, and 108, all of which are intended function as described for the antireflective coatings in the preceding embodiments.

For sake of simplicity, the polarization-sensitive reflectivity and transmissivity characteristics of the antireflective coatings 102, 104, 106, and 108 can be considered identical. If the percent reflectivity of the S polarization components at each reflective coating is denoted as "$R_S$" and the percent reflectivity of the P polarization components at each reflective coating is denoted as "$R_P$", then the percentage of S and P polarization components in the unpolarized input beam that are present in the polarized output beam 94 is given as the percent reflectivities "$R_S$" and "$R_P$" raised to the power of the number of antireflective coatings in series. In keeping with the numerical examples given above, the S polarization components in the output beam 94 equal $R_S^4$ or a minimum of $0.80^4*100$ or around 41%, and the P polarization components in output beam 94 equal $R_P^4$ or a maximum of $0.02^4*100$ or around 0.000016%. The extinction ratio of S to P polarization is given by $(R_S/R_P)^4$ or $(80/2)^4$ or 2,562,500 to 1.

Particularly if the polarizers are arranged in series as shown, the reflectivity of the S polarization is preferably as large is possible to avoid losses of light. Further reductions in the reflectivity of the P polarization can lead to extinction ratios of one billion to 1 or more. Since only the reflected beam portions propagate continuously through the succession of polarizers 82, 84, 86 and 88, the amount of light transmitted through the antireflective coatings 102, 104, 106, and 108 progressively decrease. The largest part of the P polarization components (e.g., at least 98%) is transmitted through the first-encountered antireflective surface 102 as the illustrated transmitted beam 112. The remaining transmitted beams 114, 116, and 118 include more of the S polarization components than the P polarization components because the S polarization components are more favorably reflected onward to the succeeding polarizers 84, 86 and 88. Beam disposers such as the illustrated diffuse surfaces 122, 124, 126, and 128 disperse the transmitted beams 112, 114, 116, and 118.

Figure 5:
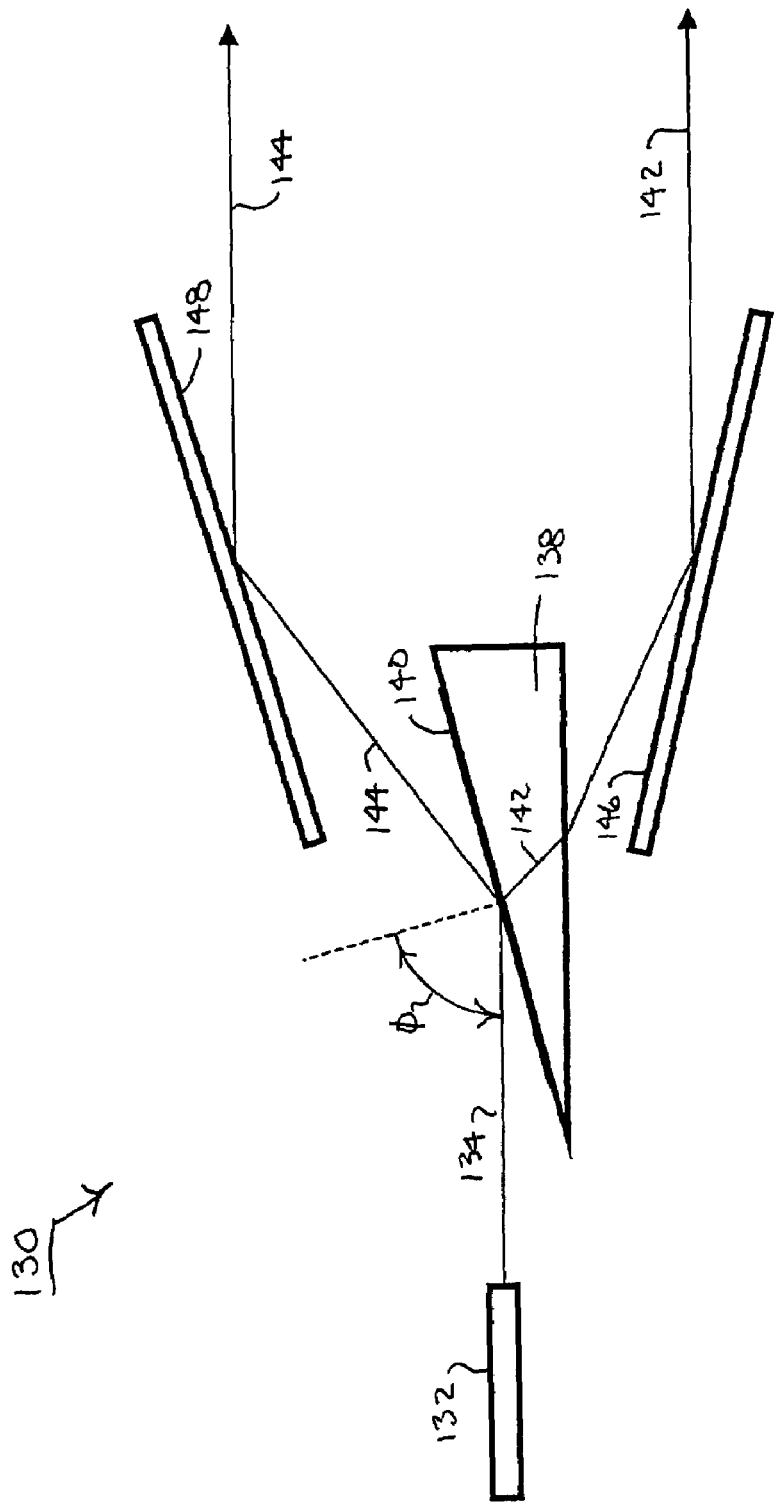
FIG. 5 is a diagram of a polarization-sensitive routing system in which an antireflector is arranged for purposes of beamsplitting.
Figure 6:
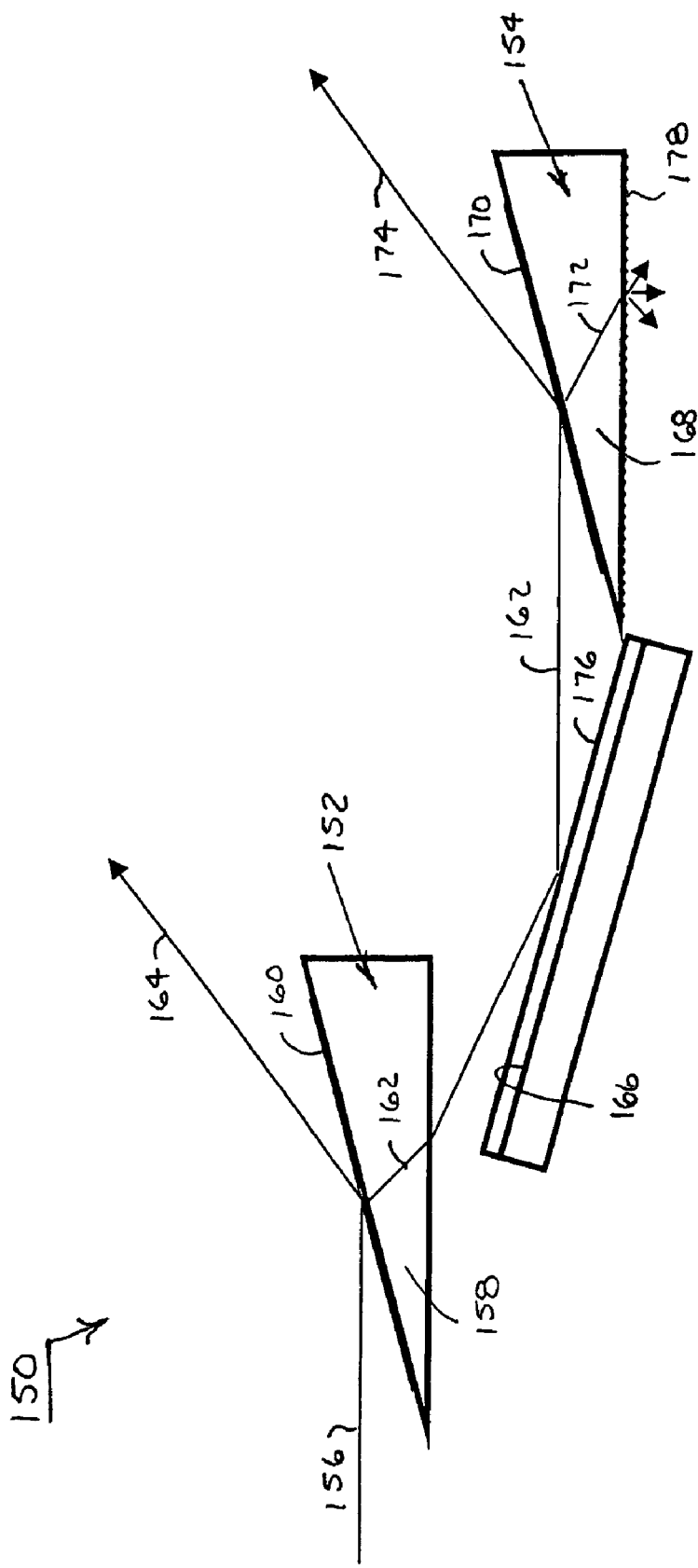
FIG. 6 is a diagram of another polarization-sensitive routing system in which a polarization rotator and a polarizer are arranged in series with a polarizing beamsplitter for polarizing a larger portion of an unpolarized input beam.

A polarization-sensitive routing system 130 is depicted in FIG. 5. Similar to the preceding embodiments featuring polarizers, a prism substrate 138 supports an antireflective coating 140. However, the antireflective coating 140 and prism substrate 138 combination function as a polarizing beamsplitter.

A laser 132 emits an unpolarized beam of light 134 having a wavelength less than. 250 nm and a power density above 5 milli-joules per square centimeter per pulse. The unpolarized beam 134 approaches the antireflective coating 140 at an angle of incidence φ between 65° and 75°. The antireflective coating 140 transmits one portion of the unpolarized beam 134 as a transmitted beam portion 142 and reflects another portion of the unpolarized beam 134 as a reflected beam portion 144. In contrast to the preceding embodiments, both the transmitted beam portion 142 and the reflected beam portion 144 are intended for further propagation and use.

As an antireflector, the antireflective coating 140 is optimized together with its inclination to the unpolarized beam 134 for transmitting the P polarization components of the unpolarized beam 134 and for avoiding reflection of the same P polarization components. Preferably, at least 98% of the P polarization components are transmitted as a part of the transmitted beam portion 142 leaving less than 2% of the P polarization components for reflection as a part of the reflected beam portion 144. In addition, the antireflective coating 140 is preferably further optimized in balance with its antireflective properties for reflecting the S polarization components of the unpolarized beam 134. At least 80% of the S polarization components of the unpolarized beam are preferably reflected as a part of the reflected beam portion 144. As such, no more than 20% of the S polarization components join the transmitted beam portion 142.

The transmitted beam portion 142 and the reflected beam portion 144 are orthogonally polarized beams. The transmitted beam portion 142 contains largely P polarization components, and the reflected beam portion 144 contains largely S polarization components. However, the reflected beam portion 144 is significantly more polarized. Given the exemplary percentages recited immediately above, the extinction ratio favoring S to P polarization for the reflected beam portion 144 is 40 to 1 (80%/2%), while the extinction ratio favoring the P to S polarization for the transmitted beam portion is around 5 to 1 (98%/20%).

Nevertheless, both the transmitted beam portion 142 and the reflected beam portion 144 propagate beyond the prism 138 and encounter further beam conveying optics in the form of reflective optics 146 and 148, which redirect the two beam portions 142 and 144 in common direction parallel to the original direction of the unpolarized beam 134. The two reflective optics 146 and 148 evidence optical investments in the further propagation of the two beam portions 142 and 144 along one or more working pathways. A wide variety of other optics can be substituted for the two reflective optics 146 and 148 to support the further optical conveyance of the two beam portions 142 and 144 in the same or different directions and in different forms, particularly for such purposes that can exploit their orthogonally related polarizations.

The prism substrate 138 is involved with the further propagation of the transmitted being portion 144 and is preferably made of a material, such as calcium fluoride ($CaF_2$), that is sufficiently transmissive for propagating the transmitted beam portion 144 with minimal losses. Although depicted as a prism, which is regarded as having mounting advantages, the substrate 138 can take a variety of other forms including that of a plane-parallel plate for supporting the antireflective coating 140.

Another polarization routing system 150 incorporates both a polarizing beamsplitter 152 and a polarizer 154 for converting a larger percentage of an unpolarized beam 156 to a common linear polarization. The unpolarized beam 156, which has a wavelength of less than 250 nm and a power density greater than five milli-joules per square centimeter per pulse, is divided by the polarizing beamsplitter 152 into a transmitted beam portion 162 and a reflected beam portion 164.

Similar to the preceding embodiment, the polarizing beamsplitter 152 includes an antireflective coating 160 supported on a prism substrate 158. The antireflective coating 140 is optimized for maximizing transmissions of the P polarization components of the unpolarized beam 156 as a part of the transmitted beam portion 162. However, the antireflective coating 140 is also effective for reflecting the S polarization components of the unpolarized beam as a part of the reflected beam portion 164. Preferably, at least 98% of the P polarization components are transmitted as a part of the transmitted beam portion 162 and at least 80% of the S polarization components are reflected as a part of the reflected beam portion 164.

The reflected beam portion 164 is already highly polarized favoring S polarization components at an extinction ratio of at least 40 to 1. Although favoring the P polarization, the transmitted beam portion 162 is not nearly as polarized as the reflected beam portion 164. The polarization routing system 150 provides for further polarizing the transmitted beam portion 162 using the polarizer 154. Similar to the preceding embodiments, the polarizer 154 has an antireflective coating 170 supported by a prism substrate 168 for highly favoring transmission of the P polarization components while also supporting reflection of the S polarization components.

An optical beam conveyor in the form of a reflective optic 166 conveys the transmitted beam portion 162 between the polarizing beamsplitter 152 and the polarizer 154. In addition, a polarization rotator in the form of a quarter-wave plate 176 is mounted on the reflective optic 166 for orthogonally rotating the polarization components of the transmitted beam portion 162. By reflection, the transmitted beam portion 162 encounters the quarter-wave plate 176 twice for completing a 90° rotation of the polarization components. Accordingly, the transmitted beam portion 162 approaches the antireflective surface 170 at an incidence angle φ, which is preferably between 65° and 75°, as a polarized beam favoring S polarization components over P polarization components. Assuming that the antireflective coatings 160 and 170 are supported on planar surfaces, the quarter-wave plate 176 could be replaced by rotating the polarizer 154 about an axis aligned with the approach of the transmitted beam portion 162.

The antireflective coating 170 is optimized for transmitting the remaining P polarization components of the polarization-rotated beam 162 as a part of a transmitted beam portion 172 while reflecting a substantial portion of the majority S polarization components of the polarization-rotated beam 162 as a reflected beam portion 174. Both the transmitted beam portion 172 and the reflected beam portion 174 are more highly polarized as a result of their encounter with the antireflective coating 170. However, due to the previous polarization of the polarization-rotated beam 162, most of its remaining light is reflected as the reflected beam portion 174. A diffusion pattern 178 on the base of the prism substrate 168 can be used to dispose of the transmitted beam portion 172.

The effective S to P extinction ratio experienced by the reflected beam portion 174 due to its intermediate polarization rotation is a product of the P to S extinction ratio of the polarizing beamsplitter 152 and the S to P extinction ratio of the polarizer 154. Assuming a no more than 2% reflection of the P polarization components together with an at least 80% reflection of the S polarization components, the effective S to P extinction ratio experienced by the transmitted beam portion 174 is at least 196 to 1 ({98%/20%}*{80%/2%}).

Both transmitted beam portions 164 and 174 are highly S polarized beams shown propagating and the same direction. However, either beam can be orthogonally polarized with respect to the other by a passing the beam through a polarization rotator such as a half-wave plate. Either the alignment of the polarizer 154 can be varied with respect to the polarizing beamsplitter 152, or a further optical beam conveyer can be used to reorient the transmitted beam portions 164 and 174 with respect to each other.

Figure 7:
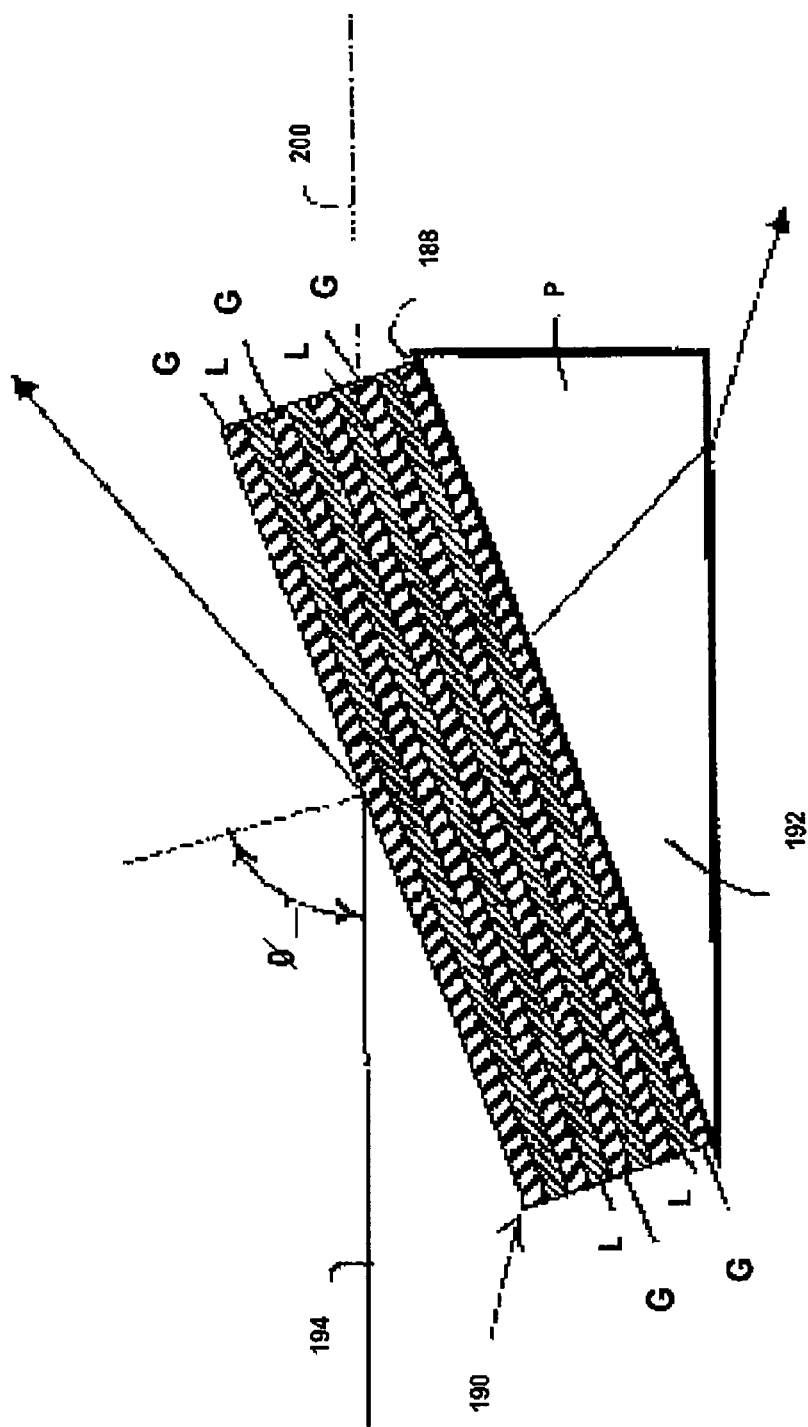
FIG. 7 is a cross-sectional view of an antireflective coating mounted on a prism substrate with the layers of the coating enlarged for emphasis.

One example of an antireflective coating 190 for use in accordance with the invention is shown in FIG. 7 applied to a leading surface 188 of a prism substrate 192 having a normal oriented at an angle φ of 73° to an optical axis 200 along which a collimated beam of unpolarized light 194 is propagated. The unpolarized beam 194 has a nominal wavelength of 193.3 nm. The prism substrate 192 is made of calcium fluoride ($CaF_2$) having a refractive index "$n_s$" of 1.5015. The antireflective coating includes alternating layers made from magnesium fluoride ($MgF_2$) as a low index layer having a refractive index "$n_L$" of 1.445 at 193.3 nm and gadolinium trifluoride ($GaF_3$) as a high index layer having a refractive index "$n_G$" of 1.674 at 193.3 nm.

The low index layers of magnesium fluoride have a normal thickness of 44.6097 nm, and the high index layers of gadolinium trifluoride have a normal thickness of 35.1721 nanometers, calculated in accordance with the following well-known relationship for defining quarter-wavelength layers:

$$n\ t\ \cos\phi = \lambda/4$$

where "n" is the refractive index of the layer ($n_L$ or $n_G$), "t" is the thickness of the layer, "φ" is the ray angle through each of the layers, and "λ" is the wavelength of light transmitted through the layers. It is the optical path length difference created by the layer that equals one-quarter of the wavelength "λ".

The ray angles "φ" derive from Snell's law as follows:

$$n_O \sin\phi_O = n_L \sin\phi_L = n_G \sin\phi_G$$

where "$n_O$" is the refractive index of air (1.00), "$\phi_O$" is the ray angle through air (73°), "$\phi_L$" is the ray angle through the low index material (41.437°), and "$\phi_G$" is the ray angle through the high index material (34.839°), The overall design of the exemplary antireflective coating 190 follows the following prescription:

P{35.0793G (44.4206L, 35.0793G)$^4$} air where P represents the calcium fluoride substrate, G represents the high index layer of gadolinium trifluoride, and L represents the low index layer of magnesium fluoride. The first layer deposited on the substrate P is the high index layer G. The exponent means the combination of low and high refractive index layers L and G are repeated four times for total of nine layers. The effective refractive indices experienced by the other two orthogonally related polarizations S and P vary as a function of their inclination to the optical axis. In practice, each of the layers of high and low index materials is laid down to a thickness at which reflection of the P polarization is at a minimum. Accordingly, each of the layers has an optical thickness in the direction of beam propagation equal to a multiple of one-quarter of the wavelength of the P polarization component to effect the desired constructive or destructive interference among reflections from the layer interfaces. It is the optical path length difference together with any phase change at the interfaces between layers that accounts for the interference properties (preferably constructive interference between the S polarization reflections and destructive interference among the P polarization reflections).

Figure 8:
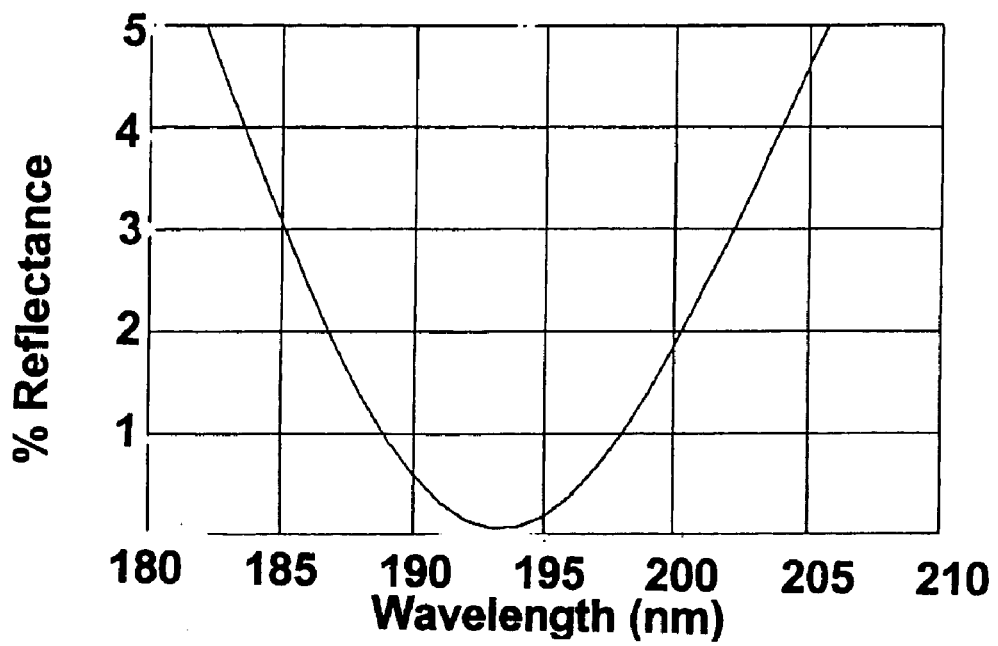
FIG. 8 is a graph showing percent reflectance of the antireflective coating of FIG. 7 as a function of wavelength.

The graph of FIG. 8 depicts the performance of the exemplary antireflective coating 190, where reflectance of the P polarization is minimized at the nominal wavelength of 193.3 nm. The minimum reflectance of the P polarization is approximately 0.02%, which is indicative of the effectiveness of the antireflective coating for minimizing reflection.

Figure 9:
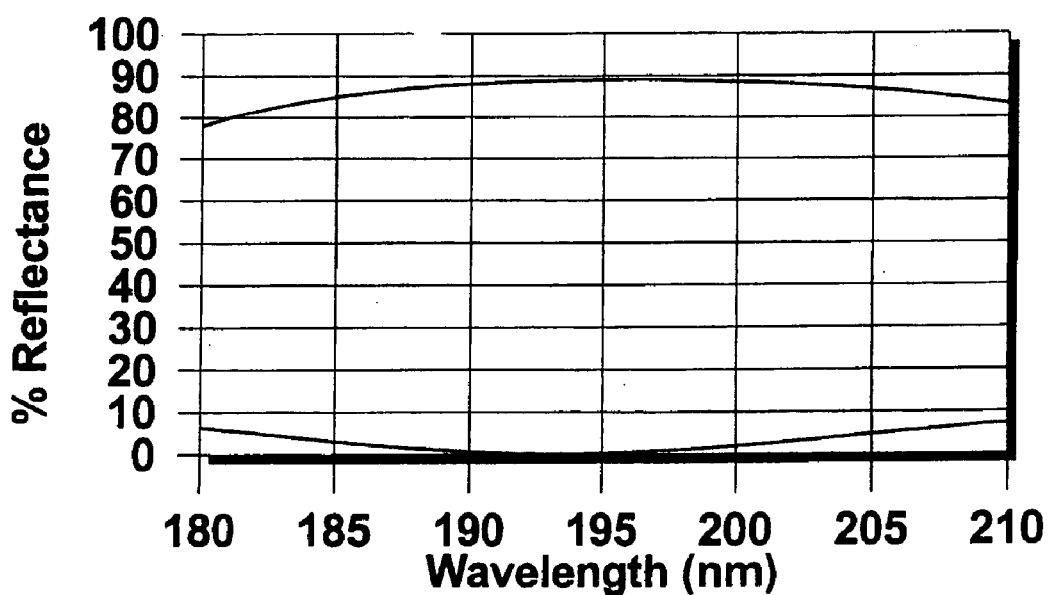
FIG. 9 is a graph showing percent reflectance of the same antireflective coating as a function of wavelength on a much larger scale to plot the reflectance of the S and P polarization components.

However, as shown in the graph of FIG. 9, the same antireflective coating 190 exhibits a surprisingly high reflectance for the S polarization component in the vicinity of the same nominal wavelength of 193.3 nm. Although the peak reflectance of the S polarization occurs at a slightly higher wavelength (~195 nm), the reflectance at the nominal wavelength of 193.3 nm is still very high, reaching nearly 90%. Thus, the antireflective coating is very efficient at separating one polarization from another, if used in reflection. The extinction ratio of S polarization to P polarization is calculated as the quotient of the 90% of the S polarization that is reflected divided by the 0.02% of the P polarization that is reflected for an extinction ratio of 4500 to 1. This is an excellent extinction ratio for most any polarizer, especially for one operating in this wavelength range and especially for one having so few layers.

Figure 10:
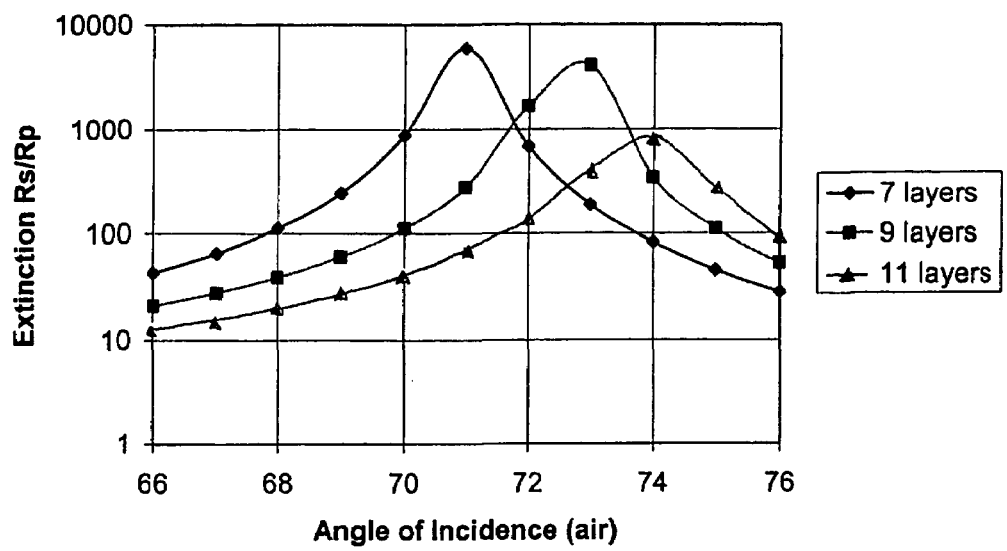
FIG. 10 is a graph plotting extinction ratio of S to P polarization reflected from similar antireflective coatings as a function of the angle of incidence for each of three antireflective coatings for each of three odd numbers of coating layers.
Figure 11:
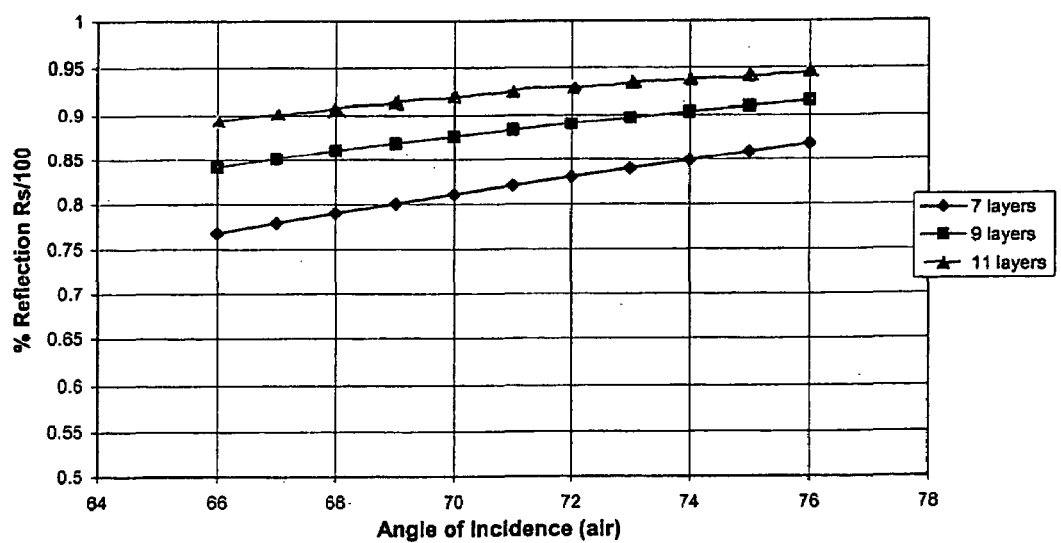
FIG. 11 is a graph plotting the reflectivity of the S polarization as a function of the angle of incidence for each of the same three antireflective coatings.

The graph of FIG. 10 plots variations in the extinction ratio of S to P polarization among the reflected light over a domain of inclination angles for each of three antireflective coatings distinguished by different odd numbers of layers. The peak extinction ratio tends to shift toward the larger incidence angles as the number of layers is increased. The graph of FIG. 11 plots the variation in the reflectivity of the S polarization over a domain of inclination angles for each of the same three antireflective coatings. Two trends are evident. First, S reflectivity tends to increase with increases in the inclination angle. Second, S reflectivity tends to increase with the number of layers. Thus, while it is possible to achieve high extinction ratios with fewer layers and lower inclination angles, the reflection efficiency of such polarizers suffers. Conversely, more layers and higher incidence angles do not necessarily result in higher extinction ratios.

The graphs of FIGS. 12A–12C illustrate the effects of a variation in the refractive index of the higher index layer "G". All three graphs plot the S to P extinction ratio of reflected light over a domain of incidence angles for three different refractive indices "$n_G$"; one set below the refractive index layer G of the exemplary antireflective coating 190 at $n_G$=1.65, one set above the refractive index layer G of the exemplary antireflective coating 190 at $n_G$=1.7, and one corresponding to the refractive index layer G of antireflective coating 190 at $n_G$=1.674. FIGS. 12A–12C differ according to the number of one-quarter wavelength layers used, varying by odd numbers from 7 to 11. The graphs show that the peak extinction ratios tend to shift toward higher incidence angles as both the index "$n_G$" of the higher index layer G increases and as the number of layers increases. Also notable is that the highest index ($n_G$=1.7) provided the highest peak extinction ratio at the fewer number of layers (7) and the lowest index ($n_G$=1.65) provided the highest peak extinction ratio at the larger number of layers (11).

Similar antireflective coatings with other refractive index combinations can be design for operating at other angles of incidence between approximately 65° to 75° and at other nominal wavelengths under 250 nm. For example, antireflective coating designs can be optimized in other combinations by varying the refractive indices of the high and low index layers, such as by using lanthanum trifluoride or neodymium trifluoride instead of the gadolinium fluoride for the high index material and perhaps aluminum fluoride instead of the magnesium fluoride for the low index material. Of course, the actual refractive index of the deposited layers is also dependent upon on the conditions of their deposition, including a deposition temperature and deposition rate. These production variables can affect the materials porosity, which in turn affects the index of refraction. The design and production of antireflective coatings is known in general from several sources, including a text entitled *Thin Film Optical Filters*, $2^{nd}$ ed., by H. A. Macleod, 1986, Macmillian Co. NY, which is hereby incorporated by reference.

While the antireflective coating 190, like the other illustrated antireflective coatings 20, 40, 60, 62, 102, 104, 106, 108, 140, 160, and 170, is shown applied to a planar substrate surface, the coating can be applied to surfaces having other shapes that reference the orthogonal polarization components to other planes of incidence. The foregoing examples of specific compositions, processes, articles, and structures employed in the practice of the invention are, of course, intended to be illustrative rather than limiting, and it will be apparent that the numerous variations and modifications of these specific embodiments may be practiced within the scope of the appended claims.

The invention claimed is:

1. A polarizing system for deep UV light comprising:
a substrate having a surface normal inclined between 65° and 75° to a direction of propagation of an unpolarized beam of light having a nominal wavelengths less than 250 nm;
an antireflective coating on the surface of the substrate that reflects no more than 2% of a first of two orthogonally related polarization components of the unpolarized beam of light;
the antireflective coating also reflects at least 80% of a second of the two orthogonally related polarization components of the unpolarized beam of light; and
an optical beam conveyor that routes a first portion of the unpolarized beam that is reflected from the antireflective coating as a substantially polarized beam intended for further propagation.

2. The polarizing system of claim 1 further comprising a beam disposer for abandoning a second portion of the unpolarized beam that is transmitted through the antireflective coating.

3. The polarizing system of claim 2 in which the substrate has first and second surfaces and the antireflective coating is on the first surface of the substrate and the beam disposer includes a diffusion pattern on the second surface of the substrate.

4. The polarizing system of claim 1 in which the antireflective coating includes a stack of layers that alternately vary in refractive index.

5. The polarizing system of claim 4 in which the stack of layers includes an innermost and an outermost layer, the innermost layer being adjacent to the substrate and the outermost layer having a refractive index that is higher than a refractive index of an adjacent layer of the stack of layers.

6. The polarizing system of claim 4 in which the layers have nominal thicknesses corresponding to optical path length differences between the layers equal to an integer multiple of one-quarter of the nominal wavelength of the unpolarized beam.

7. The polarizing system of claim 4 in which the stack includes less than 20 layers.

8. The polarizing system of claim 7 in which the stack includes at least 7 layers.

9. The polarizing system of claim 4 in which a refractive index difference between the alternating layers is at least 0.2 and no greater than 0.6.

10. The polarizing system of claim 4 in which the alternately varying layers are made from different fluoride materials.

11. The polarizing system of claim 5 in which the substrate is made of fused silica to provide thermal stability.

12. The polarizing system of claim 1 in which the antireflective coating exhibits a polarization extinction ratio between the reflected polarization components of at least 100 to 1.

13. The polarizing system of claim 1 in which the antireflective coating on the surface of the substrate provides for reflecting no more than 0.5% of the first orthogonally related polarization component of the unpolarized beam of light.

14. The polarizing system of claim 13 which the antireflective coating on the surface of the substrate provides for reflecting at least 85% of the second orthogonally related polarization component of the unpolarized beam of light.

15. The polarizing system of claim 1 in which the antireflective coating on the surface of the substrate provides for reflecting no more than 0.1% of the first orthogonally related polarization component of the unpolarized beam of light.

16. The polarizing system of claim 15 in which the antireflective coating on the surface of the substrate provides for reflecting approximately 90% of the second orthogonally related polarization component of the unpolarized beam of light.

17. The polarizing system of claim 1 in which the surface is inclined between 68° and 73° to a direction of propagation of the unpolarized beam of light.

18. The polarizing system of claim 1 in which the optical beam conveyor includes at least one reflective surface for further propagating the substantially polarized beam.

19. The polarizing system of claim 18 in which the optical beam conveyor includes a plurality of reflective surfaces for further propagating the substantially polarized beam coaxial with the propagating direction of the unpolarized beam.

20. The polarizing system of claim 18 in which the at least one reflective surface includes an antireflective coating that reflects no more than 2% of the first of two orthogonally related polarization components and that reflects at least 80% of the second of the two orthogonally related polarization components of the substantially polarized beam of light for further extinguishing the first of the two orthogonally related polarization components of the substantially polarized beam.

21. The polarizing system of claim 1 in which the unpolarized beam of light has a power densities of five milli-joules per square centimeter per pulse.

22. A polarization-sensitive routing system for ultraviolet light comprising:
    a working optical pathway for conveying an unpolarized beam of ultraviolet light having a wavelength less than 250 nm;
    an antireflector inclined to the working optical pathway such that rays within the unpolarized beam of ultraviolet light encounter the antireflector at angles of incidence above Brewster's angle;
    the antireflector including a plurality of layers that exploit a mechanism of interference for reducing reflectivity of P polarization components of the unpolarized beam that are oriented within the planes of incidence while substantially reflecting S polarization components of the unpolarized beam that are oriented normal to the planes of incidence; and
    a beam conveyer that routes a first portion of the unpolarized beam that is reflected from the antireflector as a substantially S polarized beam at an extinction ratio of S polarization to P polarization of at least 40 to 1 along the working optical pathway for productive use.

23. The routing system of claim 22 in which the antireflector transmits a second portion of the unpolarized beam as a substantially P polarized beam at an extinction ratio of P polarization to S polarization of less than 40 to 1.

24. The routing system of claim 23 further comprising a beam disposer that abandons the substantially P polarized beam that is transmitted through the antireflector.

25. The routing system of claim 23 in which the beam conveyor is a first of two beam conveyors and a second of the conveyors routes the substantially P polarized beam for further intended propagation.

26. The routing system of claim 25 in which the antireflector is formed as an antireflective coating on a substrate and the substrate is made of calcium fluoride ($CaF_2$) for transmitting the substantially P polarized beam.

27. The routing system of claim 22 in which the layers of the antireflector have a thickness is approximately equal to a multiple of one-quarter wavelength of the unpolarized light measured in the direction of the incidence of the unpolarized light.

28. The routing system of claim 27 in which adjacent layers of the antireflector have refractive indices that differ by at least 0.2 and differ by no more than 0.6.

29. The routing system of claim 28 in which the antireflector includes between 5 and 20 layers.

30. The routing system of claim 22 in which the antireflector provides for reflecting less than 2% of the P polarization component of the unpolarized beam of light and for reflecting more than 80% of the S polarization component of the unpolarized beam of light.

31. The routing system of claim 22 in which the antireflector provides for reflecting less than 0.5% of the P polarization component of the unpolarized beam of light and for reflecting more than 85% of the S polarization component of the unpolarized beam of light.

32. The routing system of claim 22 in which the antireflector is inclined to the working optical pathway such that the rays within the unpolarized beam of ultraviolet light encounter the antireflector at angles of incidence between 65° and 75°.

33. The routing system of claim 22 in which the beam conveyer includes at least one reflective surface for directing the substantially S polarized beam along the working optical pathway.

34. The routing system of claim 33 in which the beam conveyor includes a plurality of reflective surfaces for further propagating the S polarized beam coaxial with a propagating direction of the unpolarized beam along the working optical pathway.

35. The routing system of claim 34 in which at least one of the reflective surfaces includes an antireflective coating for reducing reflectivity of the P polarization components of the substantially S polarized beam while substantially reflecting the S polarization components of the substantially S polarized beam.

36. A method of polarizing light having a nominal wavelength less than 250 nm and a power density of at least five milli-joules per square centimeter per pulse comprising the steps of:
   orienting an antireflective surface with respect to an unpolarized beam of light such that individual light rays of the beam impinge upon the antireflective surface at incidence angles between 65° and 75°;
   reflecting less than 2% of a first of two orthogonally related polarization components of the unpolarized beam of light from the antireflective surface;
   reflecting more than 80% of a second of the two orthogonally related polarization components of the unpolarized beam of light from the antireflective surface; and
   routing a first portion of the unpolarized beam that is reflected from the antireflective coating as a substantially polarized beam intended for further propagation.

37. The method of claim 36 comprising a further step of abandoning a second portion of the unpolarized beam that is transmitted through the antireflective coating.

38. The method of claim 36 comprising an additional step of routing a second portion of the unpolarized beam that is transmitted through the antireflective coating as a substantially orthogonally polarized beam for further propagation.

39. The method of claim 36 in which the step of orienting the antireflective surface includes orienting the antireflective surface with respect to the unpolarized beam of light such that the individual light rays of the beam impinge upon the antireflective surface at incidence angles between 68° and 73°.

40. The method of claim 36 in which the steps of selecting include reflecting less than 0.5% of the first orthogonally related polarization component and reflecting more than 85% of the second orthogonally related polarization component.

41. A method of polarizing ultraviolet light comprising:
   conveying an unpolarized beam of ultraviolet light having a wavelength less than 250 nm along a working optical pathway;
   inclining an antireflector to the working optical pathway such that rays within the unpolarized beam of ultraviolet light encounter the antireflector at angles of incidence above Brewster's angle;
   exploiting a mechanism of interference within the antireflector for reducing reflectivity of P polarization components of the unpolarized beam that are oriented within the planes of incidence while substantially reflecting S polarization components of the unpolarized beam that are oriented normal to the planes of incidence; and
   routing a first portion of the unpolarized beam that is reflected from the antireflector as a substantially S polarized beam at an extinction ratio of S polarization to P polarization of at least 40 to 1 along the working optical pathway for productive use.

42. The method of claim 41 including an additional step of transmitting a second portion of the unpolarized beam as a substantially P polarized beam at an extinction ratio of P polarization to S polarization of less than 40 to 1.

43. The method of claim 42 including an additional step of abandoning the substantially P polarized beam that is transmitted through the antireflector.

44. The method of claim 42 including the additional step of routing the substantially P polarized beam for further intended propagation.

45. The method of claim 42 in which the step of exploiting includes reflecting less than 2% of the P polarization component of the unpolarized beam of light and reflecting more than 80% of the S polarization component of the unpolarized beam of light.

46. The method of claim 42 in which the step of exploiting includes reflecting less than 0.5% of the P polarization component of the unpolarized beam of light and reflecting more than 85% of the S polarization component of the unpolarized beam of light.

47. The method of claim 41 in which the step of inclining includes inclining the antireflector to the working optical pathway such that the rays within the unpolarized beam of ultraviolet light encounter the antireflector at angles of incidence between 65° and 75°.

48. The method of claim 41 in which the step of routing includes reflecting the substantially S polarized beam from a plurality of reflective surfaces for further propagating the substantially S polarized beam coaxial with a propagating direction of the unpolarized beam along the working optical pathway.

49. The method of claim 41 including an additional step of inclining another antireflector to the working optical pathway such that rays within the substantially S polarized beam encounter the another antireflector at angles of incidence above Brewster's angle.

50. The method of claim 49 including an additional step of exploiting a mechanism of interference within the another antireflector for reducing reflectivity of P polarization components of the substantially S polarized beam while substantially reflecting S polarization components of the substantially S polarized beam.

51. The method of claim 50 including an additional step of reflecting the substantially S polarized beam from the another antireflector at an extinction ratio of S polarization to P polarization of at least 1600 to 1 along the working optical pathway for productive use.

52. The method of claim 43 including an additional step of inclining a second antireflector to the working optical pathway such that rays within the transmitted second portion of the unpolarized beam encounter the second antireflector at angles of incidence above Brewster's angle.

53. The method of claim 51 in which the transmitted second portion of the unpolarized beam is polarization rotated with respect to the second antireflector for reflecting S polarization components the second beam portion of the beam as a majority of the second beam portion.

54. A polarizer for polarizing deep UV light comprising:
   a substrate having a mounting surface inclined to an optical axis along which the deep UV light is propagated,
   a series of layers supported on the substrate having refractive indices that vary in an alternating pattern of higher and lower refractive indicies;
   the layers being adjusted in thickness for optimizing conditions of interference between reflections of the deep UV light from adjacent layers;
   a normal of the layers being inclined to an optical axis through an angle of incidence at which an extinction ratio between orthogonally related polarization components in a reflected beam approaches a maximum;
   the angle of incidence being within a range at which the maximum extinction ratio occurs at progressively higher angles of incidence as the refractive index of the higher refractive index layers increases; and
   the number of layers being within a range at which the maximum extinction ratio occurs at progressively higher angles of incidence as the number of layers increases.

55. The polarizer of claim 54 in which the high refractive index layers have a refractive index of between 1.65 and 1.8.

56. The polarizer of claim 55 in which the low refractive index layers have a refractive index between 1.35 and 1.5.

57. The polarizer of claim 54 in which he high and low refractive index layers have a refractive index difference of at least 0.2 and no greater than 0.6.

58. The polarizer of claim 54 in which the layers include an innermost layer and an outermost layer, the innermost layer being adjacent to the substrate and the outermost layer being among the layers having a higher refractive index.

59. The polarizer of claim 54 in which the layers are arranged to promote destructive interference between reflections of P polarized light having an electric field vector extending within a plane of incidence.

60. The polarizer of claim 59 in which the layers are arranged to promote constructive interference between reflections of S polarized light having an electric field vector extending normal to the plane of incidence.

61. The polarizer of claim 54 in which the maximum extinction ratio is at least 100 to 1.

62. The polarizer of claim 61 in which the maximum extinction ratio is at least 1000 to 1.

63. The polarizer of claim 54 in which the angle of incidence is between 65° and 75°.

64. The polarizer of claim 54 in which the number of layers is at least 7 and no greater than 20.

65. The polarizer of claim 64 in which the number of layers is at least 7 and no greater than 11.

* * * * *